United States Patent [19]

O'Malley et al.

[11] Patent Number: 4,647,831
[45] Date of Patent: Mar. 3, 1987

[54] RECHARGEABLE BATTERY OPERATED APPLIANCE SYSTEM

[75] Inventors: Kevin P. O'Malley, Hinsdale; Richard K. Thomas, Elk Grove Village, both of Ill.

[73] Assignee: John Zink Company, Tulsa, Okla.

[21] Appl. No.: 848,362

[22] Filed: Apr. 4, 1986

[51] Int. Cl.⁴ .......................... H02J 7/00; H01M 10/46
[52] U.S. Cl. ........................................... 320/2; 174/48; 310/50; 320/15
[58] Field of Search ........................................ 320/2-5, 320/15; 310/50; 433/98; 174/48

[56] References Cited

U.S. PATENT DOCUMENTS

| | | | |
|---|---|---|---|
| 3,696,283 | 10/1972 | Ackley, III | 320/2 |
| 4,096,428 | 6/1978 | Hanson et al. | 433/98 X |
| 4,225,814 | 9/1980 | Gantz | 320/2 |
| 4,323,836 | 4/1982 | Rice | 320/2 |
| 4,500,150 | 2/1985 | Leibensperger et al. | 174/48 X |
| 4,591,777 | 5/1986 | McCarty et al. | 320/2 |

Primary Examiner—R. J. Hickey
Attorney, Agent, or Firm—Neil M. Rose

[57] ABSTRACT

A rechargeable battery operated appliance system including a plurality of battery operated appliances, each having a charging stand, there being plug receptacles mounted in the cord storage recesses of all but one of the charging stands with the receptacles connected in parallel with the power cords and to the charging circuits for each appliance to permit interconnection of the charging stands.

7 Claims, 6 Drawing Figures

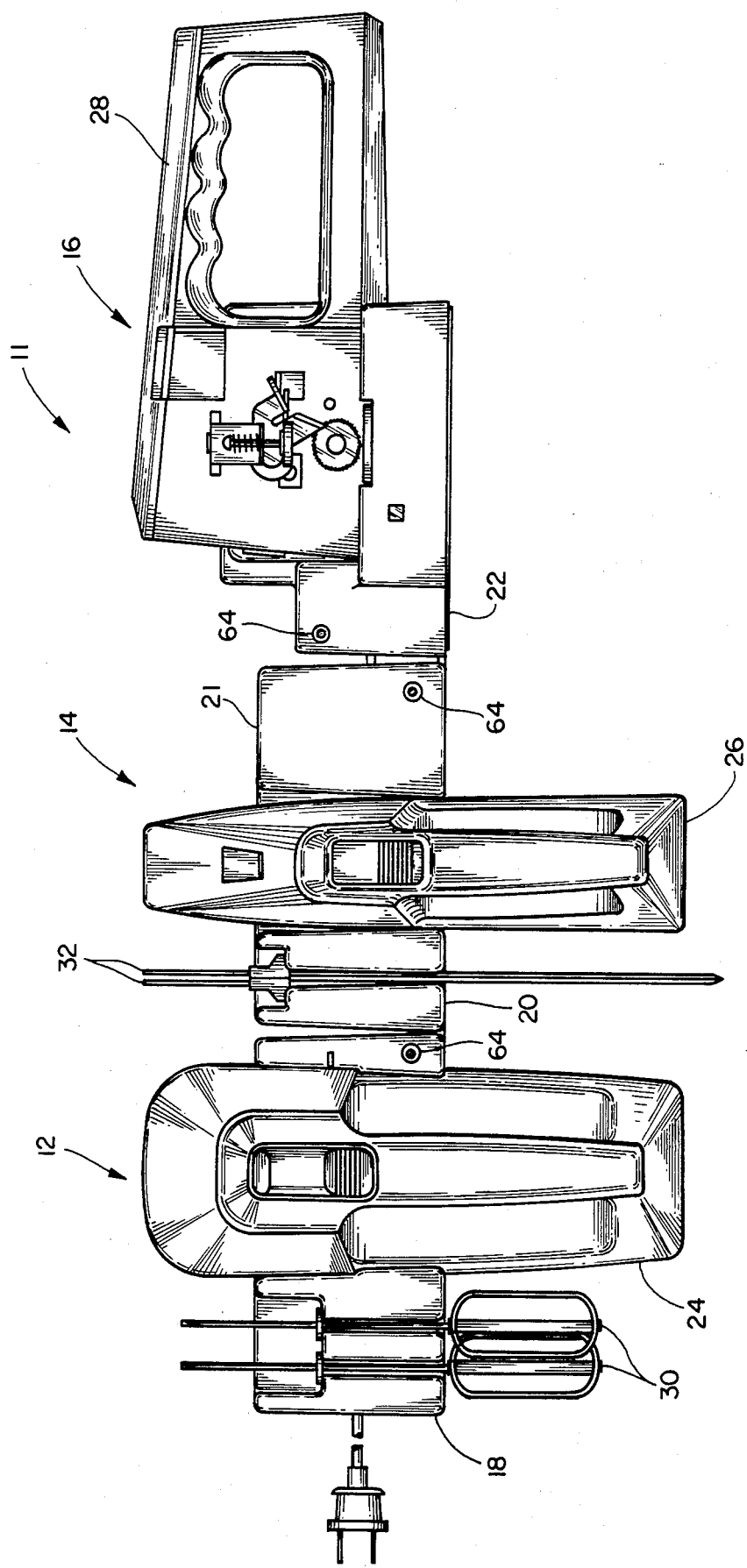

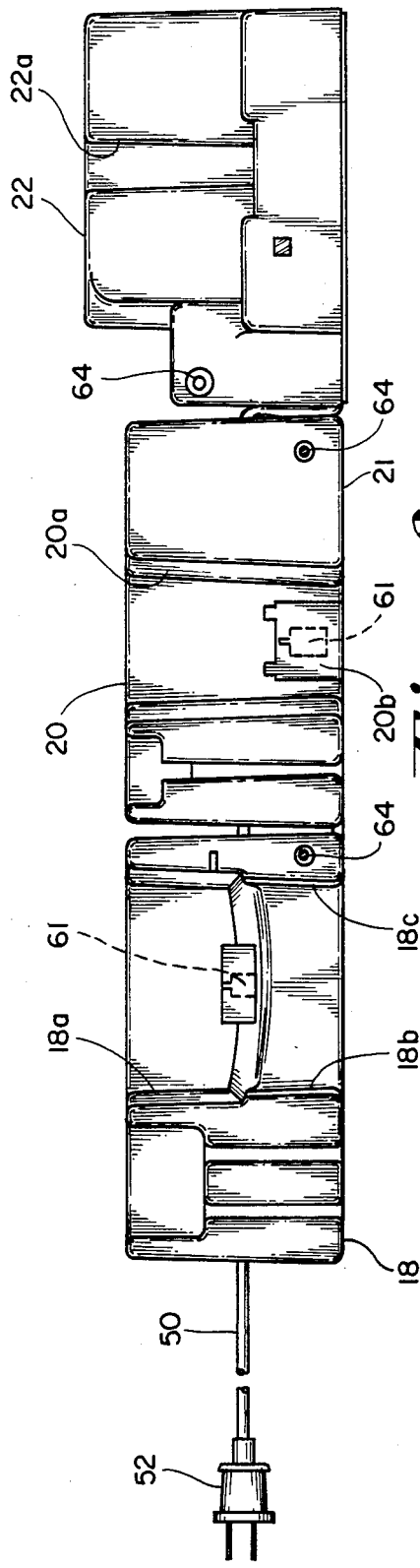
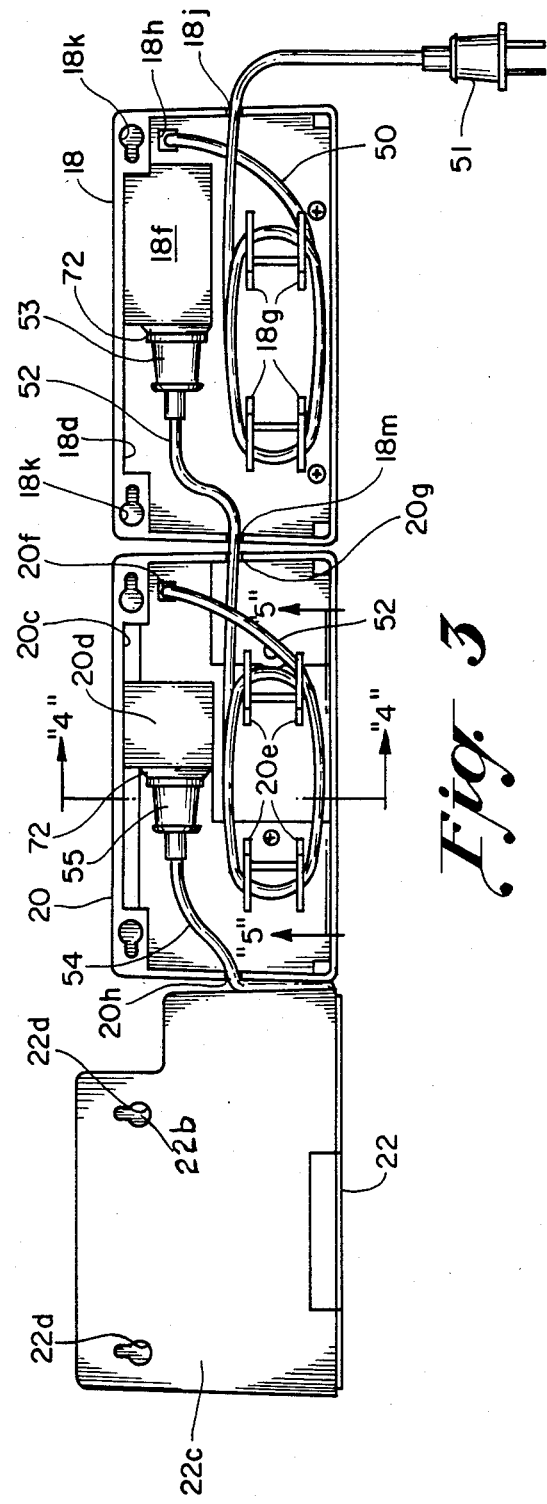

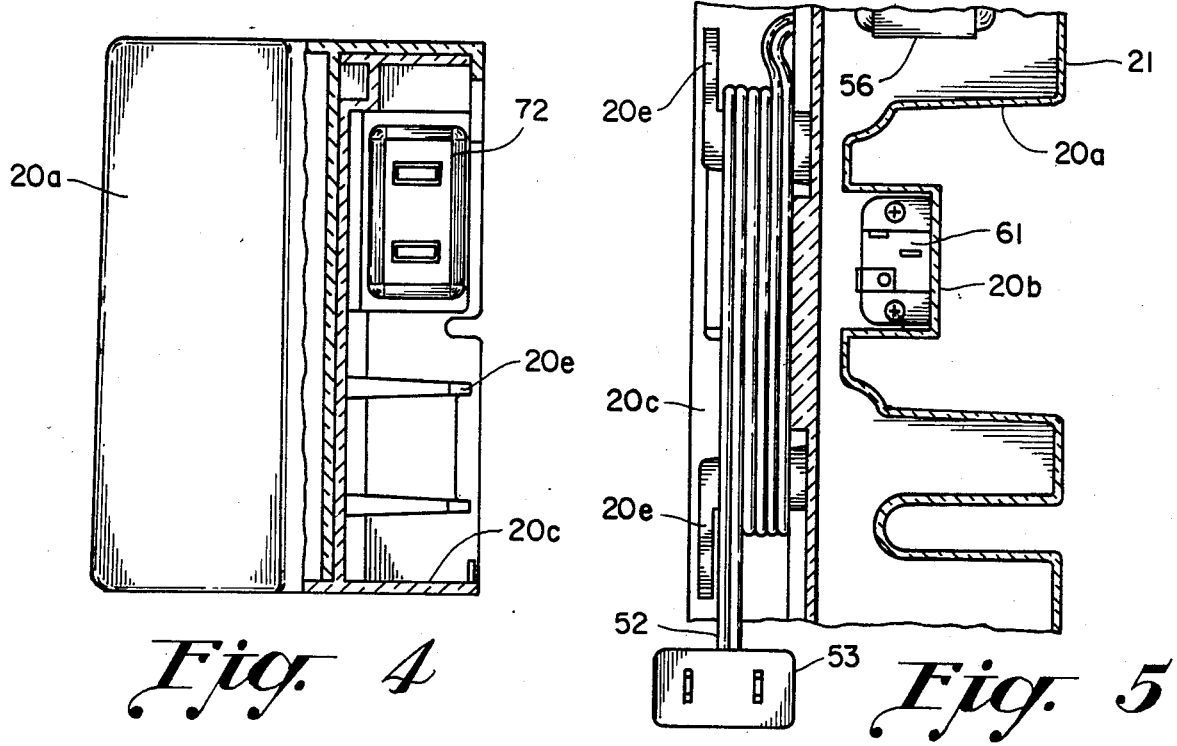
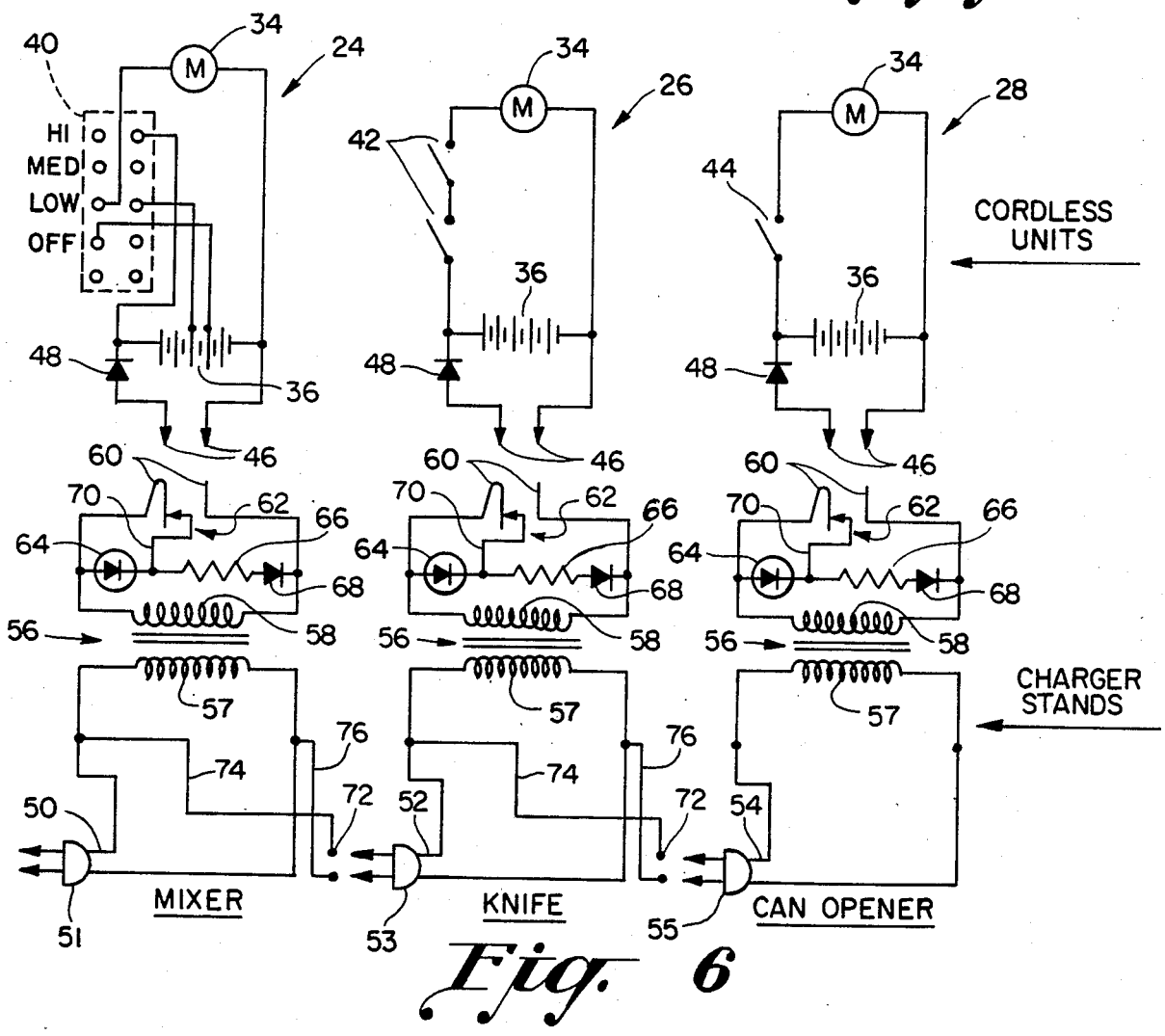

RECHARGEABLE BATTERY OPERATED APPLIANCE SYSTEM

BACKGROUND OF THE INVENTION

The present invention relates to rechargeable battery operated appliances and more specifically to a rechargeable battery operated appliance system in which a plurality of rechargeable battery operated appliances are coupled together through their charging stands for recharging purposes.

With the improvement in lightweight, rechargeable batteries, it has become common to power household kitchen appliances with such batteries. It is well known to utilize nickel cadmium battery packs with electric mixers, electric knives, and electric can openers. The nickel cadmium cells are easily recharged and provide ample power between recharging for performance of the normal mixing and slicing tasks demanded of mixers and knives, respectively. The battery operated kitchen appliances are conventionally provided with small charging stands which receive the appliance for storage purposes and at the same time recharge the batteries contained in the appliances. One of the problems which has developed is the difficulty of accommodating all of the cords which are required for the various charging stands along with the other appliance cords which might normally be used in a kitchen.

One patent showing a typical rechargeable appliance is Springer U.S. Pat. No. 3,143,697 which shows a rechargeable battery operated toothbrush with an associated charging stand which supports and receives a toothbrush for recharging the batteries. Wolter et al. U.S. Pat. No. 3,280,351 shows a mixer having a rechargeable battery pack and a charging stand for the mixer. The patent to Ackley U.S. Pat. No. 3,696,283 discloses an arrangement in which a series of recharging stands may be connected in tandem to the recharging power supply. Also of interest is the Hanson, et al. U.S. Pat. No. 4,096,428 which has a charging stand suitable for accommodating a number of rechargeable battery operated appliances. Also noted is the patent to Rice U.S. Pat. No. 4,323,836. Another approach to accommodating multiple cords is disclosed in Leibensperger, et al. U.S. Pat. No. 4,500,150. None of the foregoing arrangements are suitable for use in kitchen appliances which may be purchased separately and require means for simplifying or eliminating the problem of multiple cords or rechargers cluttering up the kitchen.

SUMMARY OF THE INVENTION

It is an object of the present invention to provide a simplified system for recharging a plurality of battery operated kitchen appliances, recognizing the fact that each should be an independent entity since it may be purchased separately but should be adapted for use in a combined system. Our invention involves providing each appliance with a charging stand including a cord and plug connected in parallel with a separate receptacle to the primary of a transformer used in the recharging circuit. The cord and plug and the receptacle are received within a recess which faces the wall and is closed by the wall when the charging stand is mounted in its intended manner on a vertical wall. Within the recess are means for storing a portion of the cord with only enough cord extending to plug into an adjacent charging stand. With this arrangement, only one of the charging stands would have its cord connected to a utility line outlet.

Since there must always be one of the appliances plugged into the utility line outlet, it is possible to market one of the charging stands suitable for use in the system without a plug receptacle since it may always be used as the one connected either directly to a utility line outlet or to the receptacle in one of the other chargers. In this way, regardless of the combination of appliances acquired and associated together, there will always be interconnectable so as to limit to one the number of cords necessary to extend to and plug into a utility line outlet.

It is, therefore, an object of the present invention to provide an improved charging system for rechargeable battery operated kitchen appliances.

It is a further object of the present invention to provide an interconnect system for a series of rechargeable battery operated appliances which minimizes the connections to be made to a utility line outlet.

It is a further object of the present invention to provide an improved charging stand for a rechargeable battery operated appliance wherein the charging stand has a cord storage recess within which is disposed a cord receptacle which is interconnected with the recharging circuit in the charging stand.

Further objects and advantages will become apparent as the following description proceeds and the features of novelty which characterize the invention will be pointed out in the claims annexed to and forming a part of the specification.

DESCRIPTION OF THE DRAWINGS

FIG. 1 is an elevational view of three rechargeable battery operated appliances which embody our invention;

FIG. 2 is a view of the recharging stands for the rechargeable battery operated appliance system shown with the appliance devices removed from the charging stands;

FIG. 3 is a rear elevational view of the three charging stands shown in FIG. 2;

FIG. 4 is an enlarged, fragmentary, sectional view taken of a charging stand on line 4—4 of FIG. 3 with the cord removed for convenience purposes;

FIG. 5 is an enlarged, fragmentary, sectional view taken substantially along line 5—5 of FIG. 3; and FIG. 6 is a schematic circuit diagram showing the circuits associated with each of the charging stands and appliance devices shown in FIG. 1 and embodying our invention.

Referring to FIG. 1 of the drawings, there is shown a rechargeable battery operated appliance system designated generally by reference numeral 11. The system includes three separate appliances, a mixing appliance 12, a knife appliance 14, and a can opener appliance 16. Each of the appliances 12, 14 and 16 includes a charging stand 18, 20 and 22, respectively, and an appliance device comprising a battery operated mixer 24, a battery operated slicing knife 26, and a portable battery operated can opener 28. The mixer 24 includes beaters 30, while the knife 26 includes a pair of serrated knife blades 32 which are detachably mounted in the knife for reciprocating movement.

The devices, including the mixer 24, the knife 26 and the can opener 28, are conventional rechargeable battery operated appliances which need not be disclosed in detail for the purposes of describing our invention.

Referring to FIG. 6, it is noted that each of these appliances includes an electric motor 34 and a source of power for the motor comprising a battery pack 36 which may typically include three to five nickel cadmium cells. The mixer 24 includes switching means 40 which permits the motor to be connected to various numbers of cells in the battery pack 36 to obtain various desired speeds of operation. The knife 26 has a pair of switches 42 which are part of an innerlock system to prevent accidental operation of the appliance. Similarly, the can opener 28 is provided with a switch 44 to selectively connected the motor 34 to the battery pack 36. Also enclosed within the housing of each of the appliance devices 24, 26 and 28 are a pair of charging contacts 46 and a diode 48 which provides direct current to the battery packs 36 for charging purposes.

Also shown in the schematic diagrams of FIG. 6 are the recharging circuits which are received within the respective charging stands 18, 20 and 22. Each of the recharging circuits includes a power cord 50, 52, 54 having a plug connector 51, 53, 55, respectively, on the end and a step-down transformer 56. Each of the transformers 56 has a primary coil 57 and a secondary coil 58. The terns ratio is such that the 120 volt AC power to which the charging stands are conventionally connected is reduced to on the order of 12 volts at the output of the secondary coil 58. To interconnect the output of the secondary coil 58 to the battery pack 36, there are provided charging contacts 60 associated with each of the charging stands 18, 20 and 22. The contacts 60 are engaged by the contacts 48 when the appliance devices 24, 26 and 28 are received within their respective charging stands 18, 20 and 22.

While the mating contacts 46 and 60 are shown only in the schematic of FIG. 6, they may typically take the form of the well known coaxial connectors, one of which is shown in FIGS. 2 and 5 designated by reference numeral 61. The connectors are automatically engaged interconnecting the pairs of contacts 46 and 60 when the appliance devices are inserted into the charging stands. Associated with each of the pairs of charging contacts 60 is a normally closed switch 62 which is opened at the time the contacts 46 and 60 are engaged. Associated with the secondary circuit of the step-down transformer 56 in each appliance charging stand is a light emitting diode 64 connected in series with a current limiting resistor 66 and a diode 68 across the secondary coil 58. The diode 68 is to protect the LED 64 against reverse voltages as is conventional. The switch 62 is associated with a conductor 70 which provides a shunt path around the LED 64. With the switch 62 closed, the LED 64 has no voltage across it and, therefore, is disabled and not illuminated. As soon as the appliance device is placed in the charging stand, the switch 62 is opened causing the LED 64 to then be illuminated.

There is one significant difference between the charging circuits for the knife and mixer as compared to the one for the can opener. The mixer and the knife have a separate plug receptacle 72 connected by leads 74 and 76 to the primary of the transformer 56, or expressed in another way, the plug receptacle 72 is connected to the power cord 50 or 52 so that when the plug 51 or 53 is inserted into a utility line outlet the receptacle 72 will also be connected to the outlet. This arrangement permits the successive charging stands to have their charging circuits connected to the plug receptacle of one of the other charging stands. It should be noted that the can opener 16 has no provision in its charging stand 22 for a receptacle 72. Since it is unnecessary to have every one of the charging stands provided with the receptacle 72, the can opener 16 was selected as the one which would always be plugged into either a utility line outlet or to one of the other receptacles 72.

Turning now to FIGS. 2 and 3, the charging stands 18, 20 and 22 are shown in their relative positions as they might be mounted on the vertical wall of a kitchen, as viewed in FIG. 2 from the front and FIG. 3 from the rear. The mixer charging stand 18 has a forwardly facing channel shaped recess 18a which receives the body of the mixing device 24 as shown in FIG. 1. The vertically extending ribs 18b and 18c defined in the wall of the channel shaped recess 18a tend to guide and retain the mixer as it is lowered into its charging position on the stand 18. The coaxial connector 61 including the contacts 60 is mounted within a recess and extends vertically so as to receive the mating connector with the contacts 46 on the mixing device 24.

Referring now to FIG. 3 and the showing therein of the charging stand 18, it is noted that there is a rearwardly facing recess 18d which is substantially closed by the engagement of the charging stand 18 against the mounting wall. Within the recess 18d is a secondary enclosure 18f within which the step-down transformer 24 and the other recharging circuitry is mounted along with the receptacle 72. As is evident from FIG. 3, the receptacle 72 is mounted so as to have its pin receiving openings facing sidewardly from the enclosure 18f so as to receive the plug 53 of the cord 52 which extends is from the adjacent charging stand 20 of the electric knife 14. Also enclosed within the recess 18d are projections 18g which are adapted to provide support for the wound portions of the cord 50. The projections 18g are identical to the projections 20e which are clearly shown in FIGS. 3 and 5. The cord 50 which is connected to the recharging circuit and the step-down transformer 56 enters the recess 18d through an opening 18h and thereafter a number of loops are made around the projections 18g to leave a sufficient amount of cord to extend to the utility line outlet. An opening 18j in the side of the recess 18d permits the cord 50 to exit from the recess 18d for connection to the utility line outlet. Suitable openings 18k are provided to mount the charging stand 18 flush against a vertical kitchen wall.

The knife charging stand 20 is in most respects similar to the charging stand 18 for the mixer. The front wall of the knife charging stand 20 has a recess 20a which takes the form of a vertically extending channel with a pocket 20b within which the coaxial connector 61 with contact 60 for the recharging circuit are received. The charging stand 20 has a rearwardly facing recess 20c and an enclosure 20d within which the cord receptacle 22 is received. The step-down transformer 56 is are mounted within a housing portion 21 as shown in FIG. 2. The cord receptacle is mounted with its terminal receiving openings facing outwardly to accommodate insertion of the plug 55 associated with the cord 54 connected to the can opener 16.

Also positioned within the recess 20c are projections 20e around which the cord 52 is wrapped as is best shown in FIG. 5 of the drawings. The cord 52 within the recess 20c issues from the enclosure 21 through an opening 20f where it is wound around the projections 20e. The cord 52 exits from the recess 20c through an opening 20g and then passes through an opening 18m into the recess 18d where the plug 52 is plugged into the receptacle 72 of the mixer recharging stand 18.

The openings 20g and 18m are aligned so that the charging stands 18 and 20 may be mounted in engagement if desired with the cord 52 passing directly through the aligned holes. As is evident from FIG. 3, the cord 52 for the knife recharging stand 20 is wrapped sufficiently around the projections 20e to leave only enough excess cord to extend to the receptacle 72 contained within the recess 18d of the mixer charging stand 18.

The can opener recharging stand 22 has a forwardly facing recess 22a which receives the can opener device 28 in position for recharging. It also has positioned in the recess 22a the coaxially disposed recharging contacts 60 which cooperate with the corresponding contacts 46 on the can opener device 28 when it is placed in the recharging stand 22. The recharging stand 22 for the can opener has a rearwardly facing recess 22b within which the excess cord may be stored, leaving a sufficient amount to extend outwardly of the recess 22b through an opening 20h in the knife charging stand 20 whereby the plug 55 for the can opener may be inserted into the plug receptacle 72 in the electric knife recess 20c. The can opener charging stand 22 has a closure plate 22c in which mounting openings 22d are provided.

As explained above, the can opener recharging stand 22 has no receptacle 72 contained therein, but includes the circuitry shown in FIG. 6 such as the step-down transformer 56, the contacts 60, the LED 64 and its associated circuitry. As best seen in FIGS. 1 and 2, the LED'S 64 of the charging circuits are visible at the front of the rechargers 18, 20 and 22 so that the user may verify whether or not the recharging circuits are activated and are charging the respective devices contained on each of the recharging stands.

We claim:

1. A rechargeable battery operated appliance system comprising: a plurality of charging stands each having a power cord for plug-in connection to a utility line outlet, a plurality of rechargeable battery appliances, each having a motor connected through switch means to rechargeable battery means, each said charging stand being formed with a recess for receiving and supporting one of said appliances, separable pairs of electrical contacts on said stands and said appliances which are engaged when each said appliance is received in each said recess to connect said battery means to a charging circuit included in each said charging stand, each said charging circuit including a step down transformer, the primary of which is connected to said power cord and the secondary of which is connected to one pair of said electrical contacts, a cord storage cavity in each of said charging stands, spaced projections within each said cavity on which any excess length of power cord may be wrapped, a plug receptacle mounted in each of said cavities and connected in parallel with said transformer primary to receive power from said power cord, each said charging stand having means for mounting on a vertical wall with said cavity facing the wall and said recess facing away from said wall whereby said appliance is received in said recess and supported by said stand, said charging stands being usable in combination with the power cord of one connected to a power outlet and each other charging stand being connected with its power cord plugged into the plug receptacle of said one charging stand or another charging stand which is powered therefrom.

2. The combination of claim 1 wherein said appliances include a mixer, a knife and a can opener.

3. The combination of claim 1 wherein said charging circuit includes a signal lamp connected across the secondary of said transformer, switch means connected across said signal lamp and acutated by positioning said appliance in said recess to enable said lamp, said lamp being disabled when said appliance is not in said recess.

4. A rechargeable battery operated appliance system comprising a plurality of rechargeable battery operated motor driven appliances, each appliance including a charging stand having means for securing it to a vertical wall and a portable manually operable device which is detachably mounted in said charging stand, each said charging stand being formed with a first recess which has an opening that faces toward the wall and is closed by the wall when the charging stand is secured to the wall, received within each said recess are a plug receptacle, a power cord and projections on which unused portions of said power cord are wound for storage purpose, each said charging stand having a second recess which receives one of said portable devices, each said device enclosing a motor and battery power supply and circuit means for selectively connecting said battery power supply to said motor, a pair of charging contacts on each said charging stand and each said portable device, said contacts being interconnected when said portable device is received in said second recess, a charging circuit in each said charging stand to supply a low voltage charging current to said battery power supply when said power cord is connected to a utility line outlet and said portable device is received in said second recess, said receptacle in each said charging stand being connected in parallel with said power cord so that said power cord of one charging stand is connected to the receptacle of another of said charging stands with only one of said charging stands connected to a power outlet.

5. The combination of claim 4 wherein said charging circuit includes a step-down transformer the primary of which is connected to said power cord and to said receptacle and the secondary being connected to the charging contacts in said charging stand.

6. The combination of claim 5 wherein said charging circuit includes a signal light connected in parallel with the seconday of said step-down transformer, said signal light being disabled by a normally closed switch until said device is received in said second recess and said two pairs of charging contacts are connected causing said normally closed switch to be opened.

7. The combination of claim 4 wherein said devices comprise a battery operated mixer, a battery operated knife and a battery operated can opener, the 15 charging stand for said can opener having no plug receptacle.

* * * * *